April 10, 1934.  H. B. CLOUD  1,954,723

CALCULATING SYSTEM AND APPARATUS THEREFOR

Filed June 16, 1932  4 Sheets-Sheet 2

April 10, 1934.   H. B. CLOUD   1,954,723
CALCULATING SYSTEM AND APPARATUS THEREFOR
Filed June 16, 1932   4 Sheets-Sheet 4

Inventor
Harry B. Cloud
By Robb & Robb
Attorneys

Patented Apr. 10, 1934

1,954,723

UNITED STATES PATENT OFFICE 1,954,723

CALCULATING SYSTEM AND APPARATUS THEREFOR

Harry B. Cloud, Tulsa, Okla.

Application June 16, 1932, Serial No. 617,662

6 Claims. (Cl. 235—83)

The present invention relates to instruments or apparatus by means of which to quickly and accurately determine mechanically an unknown calculable factor without the necessity of resorting to mathematical calculation, designed especially to save time and labor in its adaptation to the measurement of enrolled piece goods, rope, wire, etc., of various kinds and weights.

As is well known, it is necessary to take inventories of stock in trade from time to time, and in relation to the process of determining the amount on hand of, for instance, rolls or bolts of piece goods, it becomes a laborious time consuming task to unroll and measure with a yardstick the numerous bolts of cloth upon many shelves, yet, at this time, this is the only practical method of procedure, taking into account the education and experience of the average employee available for this purpose in department stores and elsewhere.

It is the object of my invention to eliminate the time, expense and chance of error of this method by providing a device embodying a system of length and weight coordinates combined with an indicator member, the operation of which may be carried out by even a novice with minimum difficulty and maximum accuracy.

An important feature of this invention is the system of coordinates, referred to, this being devised so as to permit the use of the device for measuring goods or materials, not only of various lengths, but of various weights, without the sacrifice of legibility and accuracy, such as would be incidental to the use of rectilinear curves or scale tables or diagrams.

Another important phase of this invention resides in the method I employ for finding quickly and accurately the fourth proportional to the number of yards and weight of the bolt or roll of material when purchased and the weight of the remainder when a portion of the bolt has been removed.

Other and further objects and advantages of the invention will be hereinafter set forth and the novel features thereof defined by the appended claims.

In the drawings.

Like reference characters designate corresponding parts in the several figures of the drawing.

Figure 1:
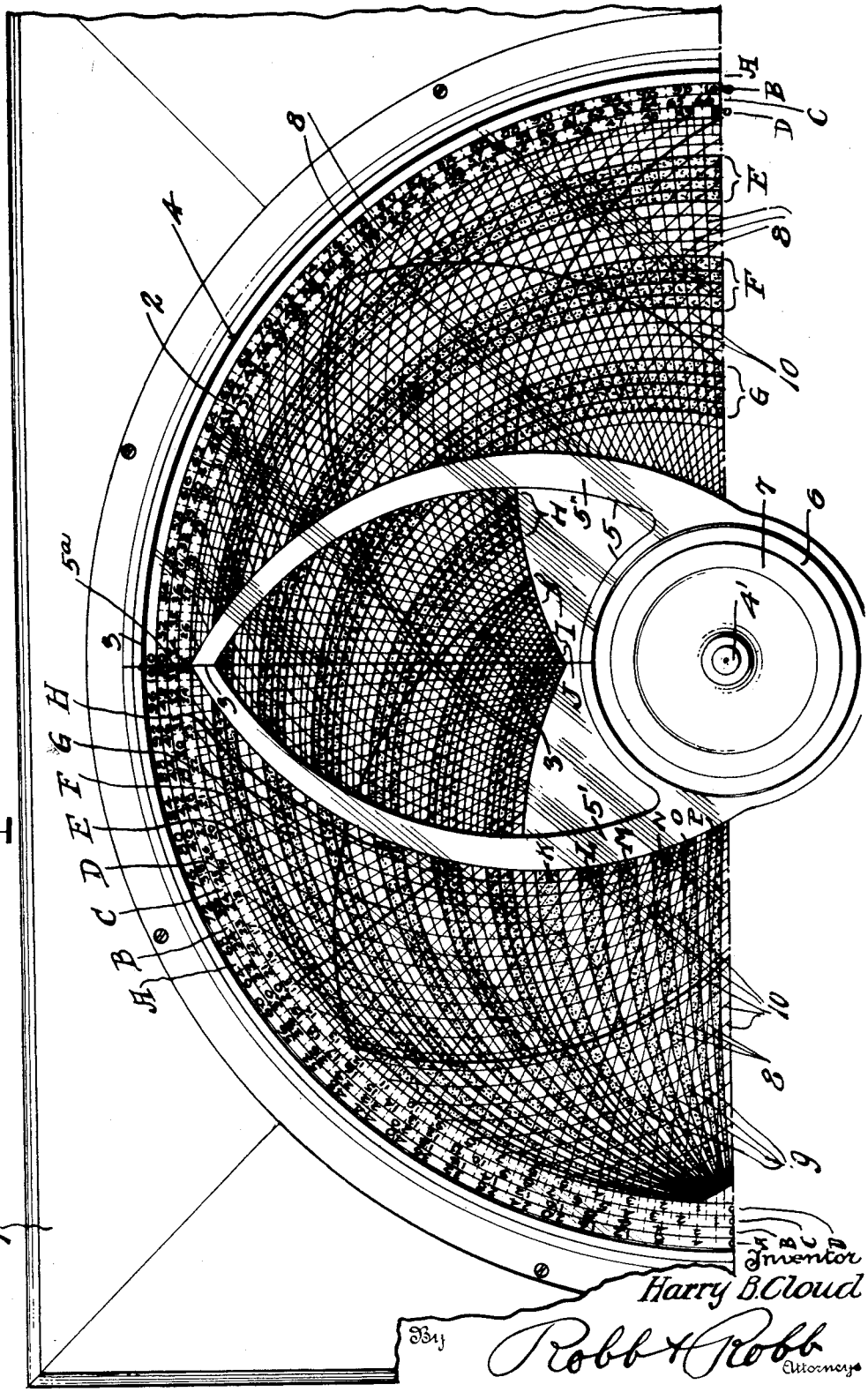
Figs. 1 and 2 are plan views of an apparatus constructed in accordance with this invention.

Referring to the drawing and specifically describing the preferred embodiment of the invention, 1 designates a suitable base, in this instance the bottom of a case having a transparent window 2 upon which is delineated a hair line 3 arranged coincident with a radius of a dial 4 mounted within the casing.

In the casing beneath this window is also mounted an indicator or pointer 5 connected with a hub which extends through the window and has mounted thereon a manipulating knob 6. The pointer is preferably formed with spaced outwardly curving arms 5', 5'', the outer edges of which are designed to cooperate with the curves upon the face of the dial to be more specifically described hereinafter. The arms aforesaid are brought together adjacent the periphery of the dial and a pointing pin 5a extends from the juncture and coacts with circumferential indicia also upon the dial. The dial is mounted upon a central hub 4' which also extends through the window 2 concentrically to the hub of the pointer, said hub 4' carrying the dial knob 7.

The dial itself is composed of a series of equally spaced radial lines 8 leading to the concentric circles A, B, C, D, at the periphery, these circles containing indicia, or numerals representing the units of measurement, pounds and yards, for use in determining length dimensions according to the principles explained herein. The circles described constitute the axes upon which the ratio curves for the respective weights and lengths are plotted, one set of these curves being designated 9, and the other, the connecting arcs 10. For the sake of convenience in reading, I preferably color equal groups of curves 9 with different colors, thereby causing the bands to stand out plainly in a way to be easily followed by the eye. These bands of curves, for the purposes of this description, are designated E, F, G, H, etc. The ratio curves or constants referred to are generated on variable radii for particular weights in relation to lengths for various kinds of materials, and knowing the weight per unit of length, a curve is plotted as against circular axes of weights and lengths, forming an arbitrary or predetermined scale, for example, one hundred yards, giving a curve for the particular goods starting from a zero line. It is to be understood that the use of multiscale circles A, B, C, D, is optional and the choice of one rather than another in the use of this apparatus is controlled by the pound-yard ratios involved; for instance, where the pounds per hundred yards run from 1 to 25, scale A is used; between 25 and 50, scale B is used; between 50 and 75, scale C; and between 75 and 100, scale D. The D scale is preferably used as the poundage scale. It should be understood, however, that any of these scales may be used for weight and any for length, as long as the same one is used for a single demonstration or problem.

This diagram of weight and length coordinates will be referred to herein as the dial and while I have shown this dial as a manually operated member, it is within the purview of my invention to so connect it to weighing mechanism that it may be automatically actuated as material is weighed to indicate the weight directly without the necessity of the manual operation aforesaid.

Figure 5:
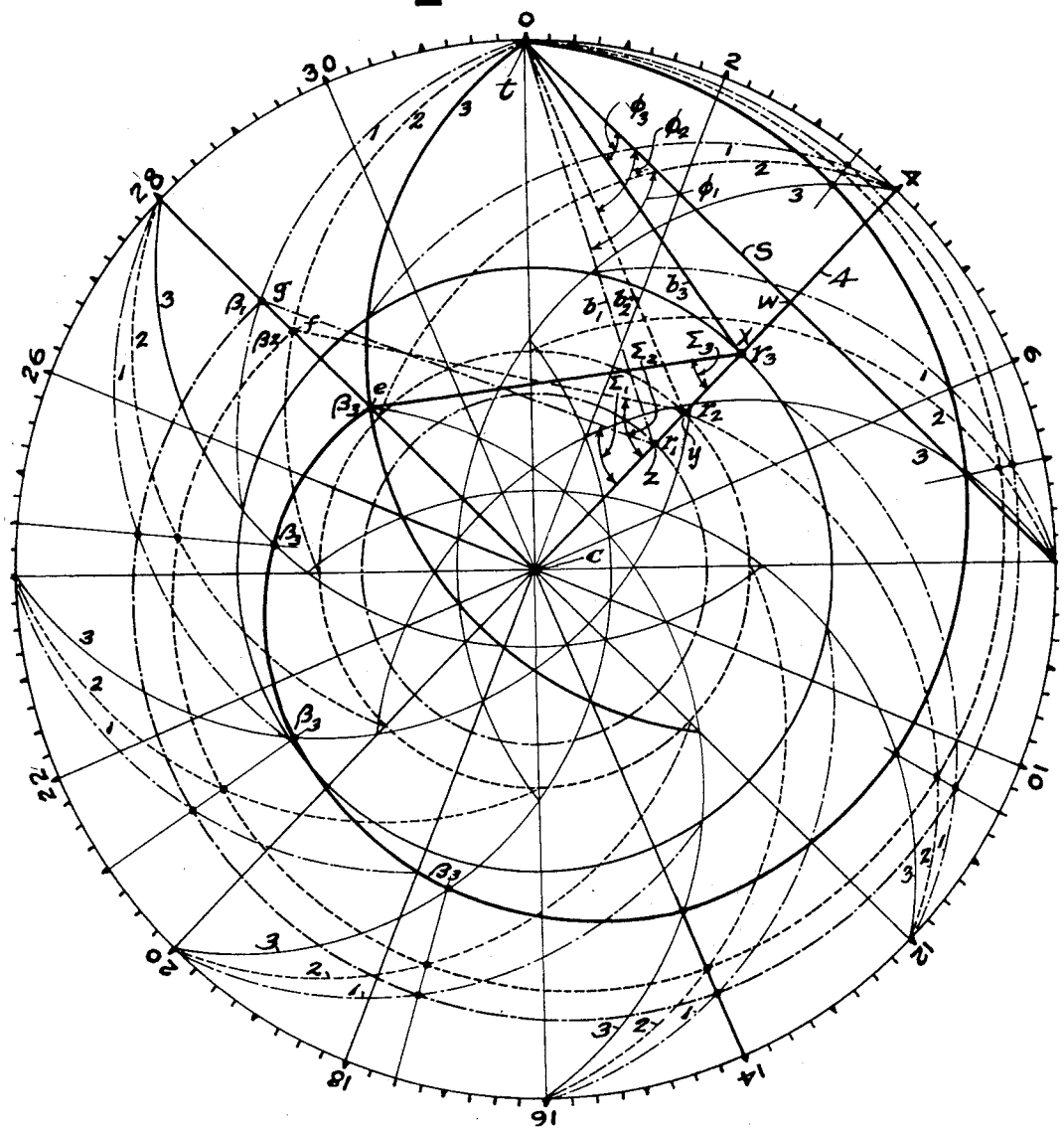
Fig. 5 is a diagrammatic view showing the development of the curves of the diagram and the curvature of the pointer arms.

The development of the diagram and the selection of the curve or arc for formation of the pointer arms cooperating with the diagram will now be described with particular reference to the diagrammatic Fig. 5 of the drawings.

First will be considered how the spiral lines or ratio curves are plotted. It must be borne in mind that the number of spiral lines which can exist on the diagram or dial is infinite. It is true that for practical results the number is limited, but, theoretically, there is no limit to the number of spiral lines that can exist. These spiral lines have a common origin, the point 0 on the circumference of the large circle. They are plotted according to the formula $$\beta = R - (R\lambda\theta) \qquad (1)$$

in which $\beta$ is the distance from the center of the large circle (on whose circumference the spirals have their point of origin) to any point on a given spiral line. (See Fig. 5 for all points and distances referred to.)

R is the radius of the large circle on whose circumference the spirals have their point of origin. $\lambda$ is the fractional part of R which $\beta$ decreases per circular degree as a given spiral line is traced from its point of origin to its termination. $\lambda$ varies between the limits 0 and 1, being constant for a given spiral line. Each spiral line has a value for $\lambda$ different from the value for any other spiral line.

Figure 2:
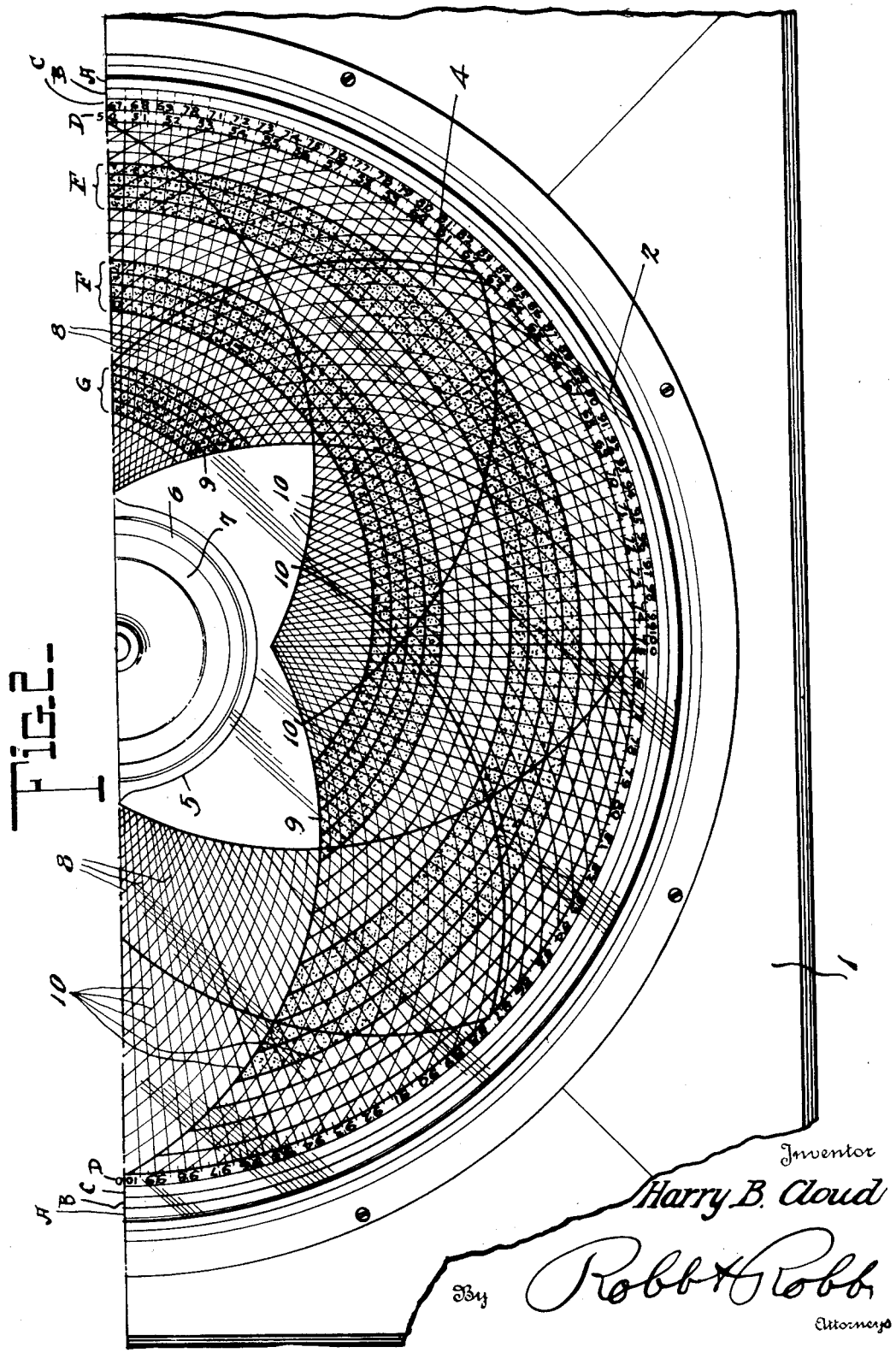
Figure 3:
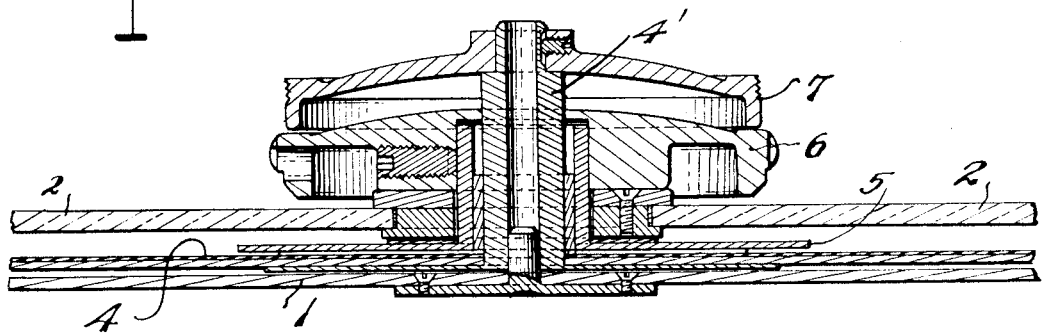
Fig. 3 is a longitudinal sectional view therethrough.
Figure 4:
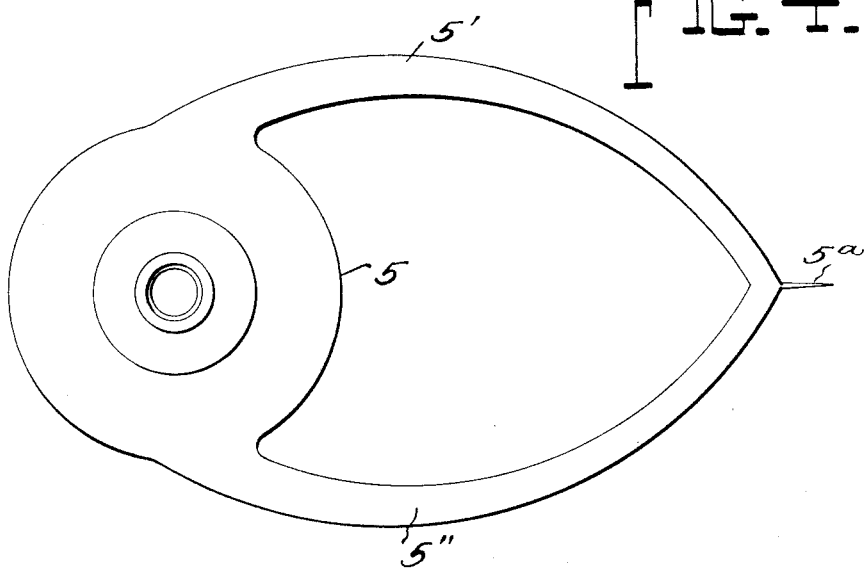
Fig. 4 is a detail view of the pointer indicator used with this apparatus.

$\theta$ is the number of degrees between the radius of the large circle at the point of origin of the spirals and a radius of the large circle which falls along $\beta$. The units in which $\theta$ is measured may be ordinary circular degrees (360 in a circle) or they may be arbitrary units (32 in Fig. 5). It must be diligently remembered that the same kind of units must be used both in the determination of $\lambda$ and in the measurement of $\theta$; that is, 360 degrees in the circle in both cases, 100 units, 32 units, or whatsoever number is chosen, as long as the system remains the same. These divisions correspond to the scales A, B, C, and D in Figs. 1 and 2.

Thus the points on the spiral lines are plotted.

The next subject to be considered is the determination of the radius of the pointer arcs and the points from which they are plotted.

While the radius of the pointer arcs remains constant for a particular chart, every chart embodying the mathematical principles herein considered does not of necessity have the same radius for its pointer arcs. (The term "the same radius" does not refer to the length of the radius as measured in some units such as inches or centimeters, but rather to the same relative radius, as compared to some constant length such as the radius of the large circle in which the chart is being drawn.) Hence, the radius for the pointer arcs may be chosen between any desired limit but after the radius for the pointer arcs is once selected it cannot be varied for that particular chart. The limits for this radius are $s$ and R, $s$ being half the length of a chord subtended by an arc of 90° of the large circle, and R being the radius of the large circle. Thus, in selecting the radius for the pointer arcs, it is necessary to choose that radius so that it is no smaller than $s$ nor no larger than R.

The pointer arc which passes through any point on the circumference of the circle has its center some place on the radius of the large circle passing through a point 45° (⅛ of the circle) to the right of the point where the pointer intercepts the radius of the large circle. Hence, on the diagram, if $b_3$ is the radius of the pointer arc 3, $r_3$ is the distance from the center of the large circle to the center around which pointer arc 3 is described. Since $b_3$, the radius of pointer arc 3 is finite, $r_3$ is predetermined by $b_3$, because $r_3$ must fall along radial line 4, as above stated; and there is only one point on radial line 4 where $b_3$ intercepts the line, since $b_3$ is finite in length. Hence $r_3$ is the radius of the plotting circle, which circle serves as the locus for the centers of the pointer arcs. The point where the plotting circle intercepts any radial line is the center for the pointer arc intercepting the large circle at a point 45° (⅛ of the circle) removed from the radial line used as a center for that particular pointer arc. Thus $r_3$ bears a constant relation to $b_3$. The same discussion follows for $b_2$, $b_1$ and $r_2$, $r_1$. The definite mathematical relation which exists between $b_3$ and $r_3$ will now be considered.

Consider the triangle $twx$, it is a right triangle because the side $tw$ is perpendicular to $wx$ from the construction of the figure. Let us call $tw$, $s$, the shortest possible length for $b$. Obviously $$tw = wc \qquad (2)$$

from construction.
Hence, the side $$wx = s - cx \qquad (3)$$

Since $$cx = r_3 \qquad (4)$$

$$wx = s - r_3 \qquad (5)$$

$$\therefore \sin \phi_3 = \frac{s - r_3}{b_3} \qquad (6)$$

Thus giving a constant relation between the terms $r_3$ and $b_3$, $s$ being constant for a given circle.

The same reasoning may be employed for $\phi_2$, $\phi_1$; $b_2$; $b_1$; $r_2$ and $r_1$.

Thus is established a mathematical expression showing definitely how $r_3$, the radius of the plotting circle, changes in relation to $b_3$, the radius of the pointer arcs.

The consideration of the relation between $r_3$ and the position of the spiral lines (such positions being represented by $\beta_3$, $\beta_2$, $\beta_1$) now follows quite logically. Before treating this phase of the subject matter it seems expedient to pause and explain that the diagram includes three spirals, but in reality they are the same line as far as using the chart for calculations is concerned. The three spirals have been drawn to demonstrate the fact that the radius of the pointer arcs, $b$, and the radius of the plotting circle, $r$, bear a definite relation to the position of the spiral line. Thus, when $b_3$ is used as the radius of the pointer arcs the point $\beta_3$ falls at a definite point; whereas, when $b_2$ is used as the radius of the pointer arcs, $\beta_2$ falls at another point. It must be carefully noted that in both cases the points $\beta_3$ and $\beta_2$ represent the same ratio, that is 32 to 28. Hence a chart could be made using either $b_3$ or $b_2$ as the radius of the pointer arcs, the radius chosen definitely determining the position of $\beta_3$ or $\beta_2$. Hence, it must be assiduously remembered that the three spirals are the same as far as working problems is concerned; the difference being that for one spiral a larger radius for the pointer arcs was chosen. Hence it is obvious that $\beta_3$ etc., could occupy an infinite number of positions along the radius of the large circle, depending upon the radius of the pointer arcs.

Now, the mathematical relation existing between $b$, $r$, and $\beta$ is to be advanced.

The angle $wcg$ is a right angle,
hence $\triangle xce$ is a right triangle.
The side
$$xc = r_3 \qquad (7)$$
The side
$$ce = \beta_3 \qquad (8)$$
$$\therefore \tan \Sigma_3 = \frac{\beta_3}{r_3} \qquad (9)$$

giving the manner in which $r_3$ varies with $\beta_3$. Since $r_3$ is established by $b_3$, a consideration of the relation between $r_3$ and $\beta_3$ is also a consideration of the relation between $b_3$ and $\beta_3$.

In consummation, the three localized formulæ have been derived:

(1) $$\beta_3 = R - (R\lambda\theta_3)$$

(2) $$\sin \phi_3 = \frac{s - r_3}{b_3}$$

(3) $$\tan \Sigma_3 = \frac{\beta_3}{r_3}$$

Now by a process of combining and condensing these formulæ it is possible to express the relation existing between $\beta$, $r$, and $b$ for any chart. The detail of the mathematical combination follows:

$$\beta = R - (R\lambda\theta) \qquad (10)$$

$$\tan \Sigma = \frac{\beta}{r} \qquad (11)$$

$$\therefore \tan \Sigma = \frac{R - (R\lambda\theta)}{r} \qquad (12)$$

but from Equation (11)

$$\beta = (\tan \Sigma) r \qquad (13)$$

$$\beta = \left(\frac{R - [R\lambda\theta]}{r}\right) r \qquad (14)$$

From Equation (6)

$$\sin \phi = \frac{s - r}{b}$$

hence $$s - r = b \sin \phi$$

and $$r = s - (b \sin \phi) \qquad (15)$$

From Equation (6)

$$\sin \phi = \frac{s - r}{b}$$

$$\therefore r = s - \left[b\left(\frac{s - r}{b}\right)\right]$$

Substitution in Equation (14)

$$\beta = \left(\frac{[R - R\lambda\theta]}{r}\right)\left(s - \left[b\left(\frac{s - r}{b}\right)\right]\right)$$

which formula shows the relation existing between $\beta$, $r$, and $b$ for a particular chart.

In answer to the question: "How does the machine work a problem in proportions?" the following consideration is offered.

In the general formula $$\beta = \left(\frac{[R - (R\lambda\theta)]}{r}\right)\left(s - \left[b\left(\frac{s - r}{b}\right)\right]\right)$$

the terms $R$, $r$, $s$, and $b$ are constant for a given chart. The term $\lambda$ is constant for a particular spiral on the chart. Hence the only variables in the formula are $\beta$ and $\theta$.

A problem in proportion is solved by the machine as a result of the intersection of a spiral line with a radius of the large circle and one of the pointer arcs. That is, there is an intersection of three lines at the point $\beta_3$, the lines being an arc (arc 3) of radius $b_3$, a radius of the large circle, and the spiral upon which $\beta_3$ is located. The arc intercepts the circumference of the large circle at the 32 point, while the radius passing through $\beta_3$ intercepts the circumference of the large circle at the point 28. Therefore the position of $\beta_3$ represents the ratio between 32 and 28. As the spiral upon which $\beta_3$ is located is traced back toward its point of origin it will be observed that $\beta_3$ increases in length, that is the spiral shows an increase in radius as it approaches its point of origin. Thus at radial position 21, $\beta_3$ intercepts an arc which passes through positon 24 on the circumference of the large circle. Therefore at this new position $\beta_3$ falls at the intersection of lines from two numbers which are in the same ratio as 32 to 28. Thus, by following $\beta_3$ we may solve any problem in ratio, such as $32 : 28 :: 12 : x$, in which case $x$ will be found by tracing the pointer arc passing through position 12 to its intersection with the spiral upon which $\beta_3$ is located and observing the radial line which passes through that point, the position of this radial line being the desired answer.

From the general formula stated above: $\beta$ and $\theta$ are the only variables.

As $\theta$ increases $\beta$ must decrease, because a function of $\theta$ is being constantly subtracted from $R$, a constant; hence the larger $\theta$ becomes the smaller $\beta$. That is, as the position of $\beta$ moves around the circle its length decreases in proportion to the degrees it has traversed from its point of origin; therefore it intercepts arcs cutting the circle at proportionally greater distances from the radial position of $\beta$.

Having described the apparatus and the manner of its construction, I will now set forth the method of procedure to determine the length of a remnant of goods through the instrumentality of this device.

It should first be understood that when a bolt or roll of goods is purchased, it is placed upon a scale to determine its weight, in carrying out the procedure for the use of this invention. Knowing its weight and length, the device hereinbefore described is manipulated to determine what one hundred yards of the material should weigh, and this number designated for the convenience of this description the index number, is placed upon a tag connected to the bolt or upon the board on which the bolt of material is wrapped, for reasons which will later appear. Of course, it is unnecessary to weight a whole bolt, as the same result may be obtained by weighing a unit length thereof.

Proceeding with the operation let it be supposed that the bolt of material weighed thirty pounds and contained seventy-five yards. By manipulating the knob 7 of the dial the thirty-pound mark on scale D is brought under the hair line 3 on the window 2. The pointer 5 is now moved toward the right to the first numeral 75 in the scale circles, this occurring in scale B. Following down the curved edge of the arm 5', it is noted that its arc intersects the radial designated 30 at the top curve of the third group of colored bands, designated G. This is the curve for the ratio set up. Now, to convert the weight to the unit of one hundred yards, the pointer is moved around to the first one hundred (100) encountered in the scales,—again in the B scale, and the dial together with the pointer is then rotated to the left to bring the intersection of the arm 5' and the top curve of the band G referred to under the hair line. Reading up the hair line to the poundage scale D it will be found that it stands over the numeral 40. This is the index number or weight to be placed upon the bolt together with the designation of the length scale circle used for the convenience of future calculation, thus: 40—B.

Whenever a portion of this material has been cut off, the remainder may be quickly and accurately determined in the following manner. Let it be supposed that the remainder weighs twenty-five pounds. The ratio curve to be used for this index number 40—B is first located by setting numeral 40 on the scale D under the hair line and then moving the pointer to 100 on the B scale, where it is observed that the curve intersected by the arm arc and forty-pound radial is the top of the third colored band or group designated G. The dial of the device is now moved until the hair line stands over the numeral 25 on the scale D. The pointer is now moved until the edge of the curved arm 5' meets the point of intersection of the hair line and top of the third band and yardage noted on the B scale at the tip of the pointer arm. This is found to point to 62½ yards, the length of the remnant.

The right-hand arm 5" of the pointer would be used in the same manner and according to the same general procedure set forth in the above example, in those instances where the weight of the material is greater than the yardage, as in the case of overcoat material, heavy rope or cable, under which conditions the scales A, B, C, and D would be preferably carried out farther than the unit of 100.

While the operation which I have described above is preferably carried out by the use of several scales, it is possible to retain all manipulations in the first quadrant and it is only for the sake of convenience that the multiscale arrangement is employed.

It may be also stated that the arms of the pointer 5 are shown in curved form, the curve being preferably such that it will intersect all of the ratio curves in one quadrant of the diagram.

It is to be understood further that the use of my invention is not confined to the solution of ratio problems involving weight and length units alone, which have been referred to herein by way of examples, as the units may be expressed in terms of volume, quantity expressed by way of number, etc.

While the specific details of construction have been herein shown and described, the invention is not confined thereto as changes and alterations may be made without departing from the spirit thereof as defined by the appended claims.

Having thus described my invention, what I claim as new and desire to secure by Letters Patent is:

1. In calculating apparatus of the class described, the combination of a dial having thereon a diagram of ratio coordinates and carrying at least one scale about the margin thereof, a stationary indicator associated therewith, a pointer member having its axis at the center of the indicator, said pointer comprising a curved arm the arc of which coacts with the diagram upon the dial and an indicator point extending radially from the free end of said arm and coacting with the marginal scale, and coaxial means for rotating the arm and dial relative to the stationary indicator.

2. In calculating apparatus of the class described, the combination of a casing having a window, a dial beneath the window having thereon a diagram of ratio coordinates, a stationary indicator on the window aforesaid, a pointer operable over the face of the dial and comprising spaced arcuate arms converging at the periphery of the dial, and means for adjusting the dial and pointer in relation to the indicator on the window.

3. In calculating apparatus of the class described, the combination with a stationary and a movable indicator of a dial member having a diagram of ratio coordinates thereon defining a plurality of curves and a plurality of circumferential scales adjacent the periphery of the dial, the movable indicator aforesaid being shaped to provide an arc intersecting the curves borne by the dial, and means for moving said dial and movable indicator relatively to said stationary indicator and to each other.

4. In calculating apparatus of the class described, the combination of a dial having delineated thereon a diagram of ratio coordinates having their positions conforming to the formula $\beta = R - (R\lambda\theta)$, a stationary indicator associated with said dial and extending radially of the dial, a pointer member having its axis at the center of the dial and comprising a curved arm, the curvature of which conforms to the formula $$\tan \Sigma = \frac{\beta}{r},$$

and means for independently adjusting the pointer and dial relative to the stationary indicator.

5. In calculating apparatus of the class described, the combination of a dial having delineated thereon a diagram of ratio coordinates having their positions conforming to the formula $\beta = R - (R\lambda\theta)$, a stationary indicator associated with said dial and extending radially of the dial, a pointer member having its axis at the center of the dial and comprising a curved arm, the curvature or which conforms to the formula $$\tan \Sigma = \frac{\beta}{r}$$

and means for independently adjusting the pointer and dial relative to the stationary indicator, said coordinates, pointer, and stationary indicator having the relation of $$\beta=\left(\frac{[R-(R\lambda\theta)]}{r}\right)\left(s-\left[b\left(\frac{s-r}{b}\right)\right]\right)$$

in any such position of adjustment of the pointer and dial.

6. In calculating apparatus of the class described, the combination of a dial having thereon a diagram of ratio coordinates and carrying at least one scale about the margin thereof, a stationary indicator associated with said dial, a movable indicator embodying an arc coacting with the diagram upon the dial and including a radial indicator coacting with the marginal scale, and means for moving said movable indicator and dial relative to the stationary indicator.

HARRY B. CLOUD.